United States Patent [19]

Ohashi et al.

[11] Patent Number: 4,627,105
[45] Date of Patent: Dec. 2, 1986

[54] SIGNAL TRANSMISSION SYSTEM AND METHOD

[75] Inventors: Kazuo Ohashi; Takuya Yamakawa, both of Kanagawa, Japan

[73] Assignee: Sumitomo Electric Industries, Inc., Osaka, Japan

[21] Appl. No.: 742,860

[22] Filed: Jun. 10, 1985

[30] Foreign Application Priority Data

Jun. 11, 1984 [JP]  Japan .................................. 59-119633

[51] Int. Cl.⁴ ............................................... H04B 9/00
[52] U.S. Cl. ......................................... 455/612; 332/1;
   370/3; 375/23; 455/608; 455/617
[58] Field of Search ...................... 370/1, 3; 375/23;
   455/608, 611, 612, 615, 617, 601, 2; 332/1

[56] References Cited

U.S. PATENT DOCUMENTS 3,575,665  4/1971  Honma .................................. 375/23
4,399,564  8/1983  Cowen .................................. 375/23

OTHER PUBLICATIONS

Fox—"The Fibrevision Trial"—IFOC-Nov./Dec. 1982, pp. 7, 8, 10, 11, 14.

*Primary Examiner*—Joseph A. Orsino, Jr.
*Attorney, Agent, or Firm*—Cushman, Darby & Cushman

[57] ABSTRACT

A sub-center type switched-star CATV system network in which a number of transmission signals are transmitted from a central source to a number of sub-centers over a number of sets of optical fibers. In view of the long distances involved, the transmission signals are transmitted in pulse frequency modulation form, one pulse frequency modulation signal being applied to each optical fiber. At each sub-center, each pulse frequency modulation signal is converted into a frequency modulation signal by first frequency dividing the pulse frequency modulation signal and then passing the divided signal through a band-pass filter which eliminates all signal components except the fundamental frequency. The pulse frequency modulated signals may pass through a switch to select the number of transmission signals which ultimately reach the subscribers. The frequency modulated signals are then frequency multiplexed to produce a multiplexed signal and the multiplexed signal is sent to a number of subscribers. A single optical fiber connects a sub-center with each associated subscriber, respectively. At each subscriber, the multiplexed signal is converted back into the selected number of transmission signals.

21 Claims, 3 Drawing Figures

SIGNAL TRANSMISSION SYSTEM AND METHOD

BACKGROUND OF THE INVENTION

1. Field of the Invention

This invention relates to optical transmission systems. More particularly, the invention relates to an optical transmission system having a "sub-center type arrangement" in which signals are transmitted from a central source to a plurality of sub-centers through optical fibers and are then transmitted from each sub-center to a plurality of subscribers through other optical fibers.

2. Description of the Prior Art

A variety of applications of optical fiber cables have been proposed such as, for example, two-way CATV systems. FIG. 1 shows a conventional general arrangement in which optical fiber cables extend from a CATV center 10 to each of subscribers 12-1, 12-2, ..., 12-n through a separate optical fiber. The arrangement illustrated in FIG. 1 may readily be employed when the number of subscribers is small. However, in an urban CATV system, where there may be more than several hundred thousand subscribers, the optical fiber distribution system of FIG. 1 becomes unwieldy due to the large number of optical fibers that must connect center 10 with subscribers 12-1 through 12-n.

It has been proposed in the past that the difficulties inherent with the arrangement illustrated in FIG. 1 may be eliminated by so-called "sub-center type switched-star network" as illustrated in FIG. 2 in which the overall service area is divided into a number of sub-areas which each includes a sub-center. Signals from a CATV center 10 are transmitted along the transmission lines A to each of sub-centers 14-1 to 14-X and each of the sub-centers retransmits the signals to a number of subscribers over lines B. Thus, as shown in FIG. 2, CATV center 10 is connected to sub-centers 14-1, 14-2 and 14-3 and sub-center 14-4 is connected to sub-center 14-3 over links A. Sub-center 14-1 is connected to subscribers 16-1 to 16-n. Sub-center 14-2 is connected to subscribers 18-1 to 18-n, sub-center 14-3 is connected to subscribers 20-1 to 20-n, and sub-center 14-4 is connected to subscribers 22-1 to 22-n all over links B.

In the CATV system shown in FIG. 2, links A and links B are used for picture signal transmission. However, as a result of the arrangement of the system, links A and links B should optimally have different performance standards and carry picture signals over different distances. Accordingly, in an optical system, transmission over links A should be different from the transmission over links B. Table 1, on this page of this application, summarizes the inherent differences between links A and links B in the system illustrated in FIG. 2.

TABLE 1

| CONDITIONS REQUIRED FOR LINKS A AND B | | |
|---|---|---|
| ITEM REQUIREMENTS | LINK A | LINK B |
| 1 No. of Transmission Channels | 30–50 Channels Per Sub-center | At Least 2 Channels Per Subscriber |
| 2 Number of Optical Fiber Cores | 30–50 Cores-One For Each Channel Is Acceptible | One Core Per Subscriber Desirable To Minimize Total No. |
| 3 Transmission Distance | 2 to 10 Km or More | Less Than 2 Km |

It is different conditions for transmission over links A and links B as summarized in Table 1 that warrant the difference in transmission systems employed over links A as compared to links B. However, employment of different transmission systems for links A and B makes a CATV system intricate and increases operating costs.

SUMMARY OF THE INVENTION

The present solves these problems by providing an optical transmission system which achieves the seemingly contradictory goals of optimizing transmissions over both the A links and the B links as illustrated in FIG. 2 while at the same time reducing operating costs and simplifying the system. In accordance with the present invention, a central source of transmission signals includes apparatus for converting each of the transmission signals into a pulse frequency modulation (PFM) signal. These PFM signals are optically transmitted to each of a number of sub-centers. At the sub-centers, these PFM signals are converted into frequency modulated (FM) signals and then the FM signals are frequency multiplexed to produce a multiplexed signal. Then, the multiplexed signal from each sub-center is transmitted to a plurality of subscribers. At the subscribers, the multiplexed signal is converted back into the plurality of transmission signals.

The conversion from PFM signals into FM signals may be performed at each sub-center by frequency dividing the PFM signals and then passing the frequency divided signals through band-pass filters to form the FM signals.

The PFM signals from the central source may be transmitted to each sub-center over a set of optical fibers, one PFM signal being transmitted over each optical fiber. The multiplexed signal from each sub-center may be optically transmitted to one subscriber over a single optical fiber, respectively.

Finally, a switching device may be included in association with the conversion of the PFM signals into FM signals to limit the number of transmission signals from the central source which reach the subscriber.

Such approaches achieve may advantages in the present invention. Since a PFM system is employed between the central source and the distant sub-centers, i.e., over links A, excellent signal-to-noise characteristics may be attained despite the long transmission distance particularly if the frequency deviation in the PFM system is increased. At the same time, the FM system employed to transmit signals from each sub-center to a number of subscribers allow all transmission signals in a frequency multiplexed form to be transmitted over a single optical fiber, thus reducing the total amount of optical fibers necessary for the system.

Also, the conversion from the PFM system to the FM system is easily accomplished. By first frequency dividing the PFM signal, the increased frequency deviation provided in the PFM system is reduced. By passing the frequency divided signals through band-pass filter, harmonic components of the signals are removed which allows the resulting FM signals to be easily frequency multiplexed.

Also, by switching PFM signals either before or after frequency division at each sub-center to select the number of channels to each subscriber, cross-talk problems do not arrise. That is, when compared to a conventional video swith for base band video signals, the video switch of the present invention must control square wave digital signals. Therefore, when the specifications for a system strictly limit cross-talk, for example, the switch of the present invention does not bind system performance. In manufacturing a video switch for baseband video signals in the form of an integrated circuit, it is difficult for the existing technology to produce a video switch with very small levels of cross-talk. Since, in the present invention, switching occurs with respect to PFM signals, cross-talk does not degrade signal quality so that this feature of the present invention allows the present invention to be miniaturized and easily manufactured in the form of an integrated circuit.

BRIEF DESCRIPTION OF THE DRAWINGS

These and other objects and advantages of this invention will become more apparent and more readily appreciated from the following detailed description of the present preferred embodiment, taken in conjunction with the accompanying drawings, of which.

DETAILED DESCRIPTION OF THE PRESENTLY PREFERRED EXAMPLARY EMBODIMENT

Figure 3:
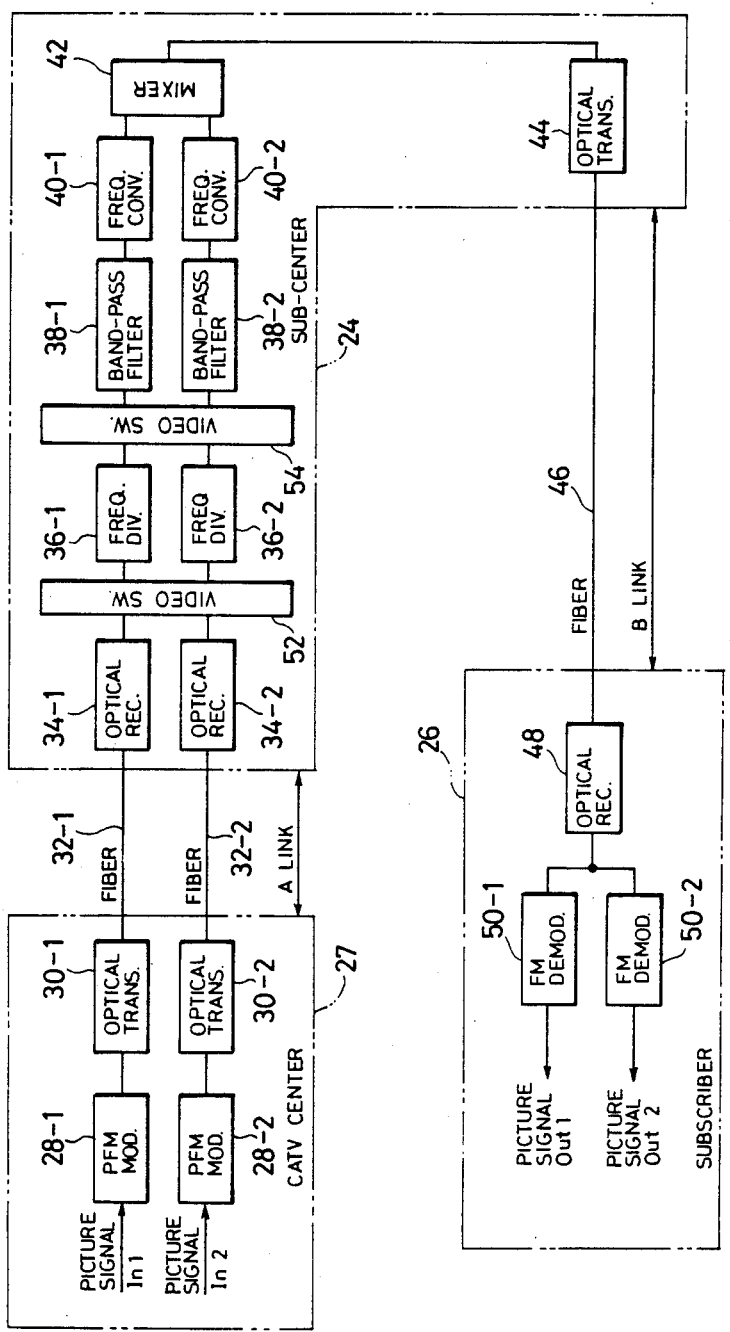
FIG. 3 is detailed block diagram of a transmission system in accordance with the present invention.

An embodiment of this invention will now be descirbed with reference to FIG. 3.

Figure 1:
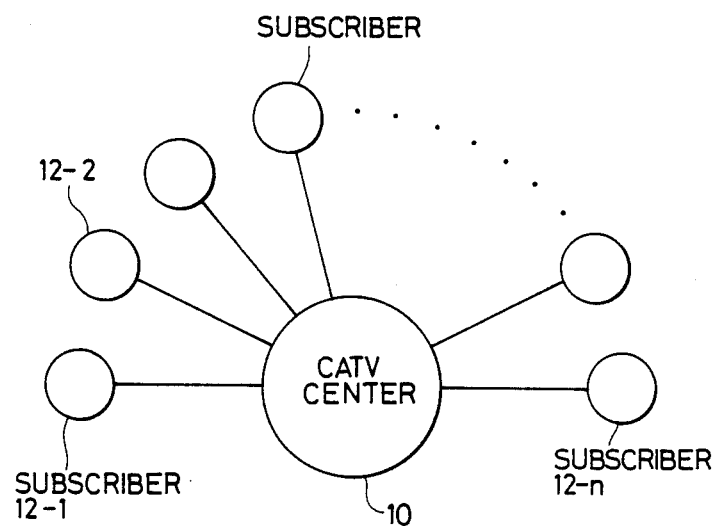
FIG. 1 is a block diagram of a prior art optical transmission system.
Figure 2:
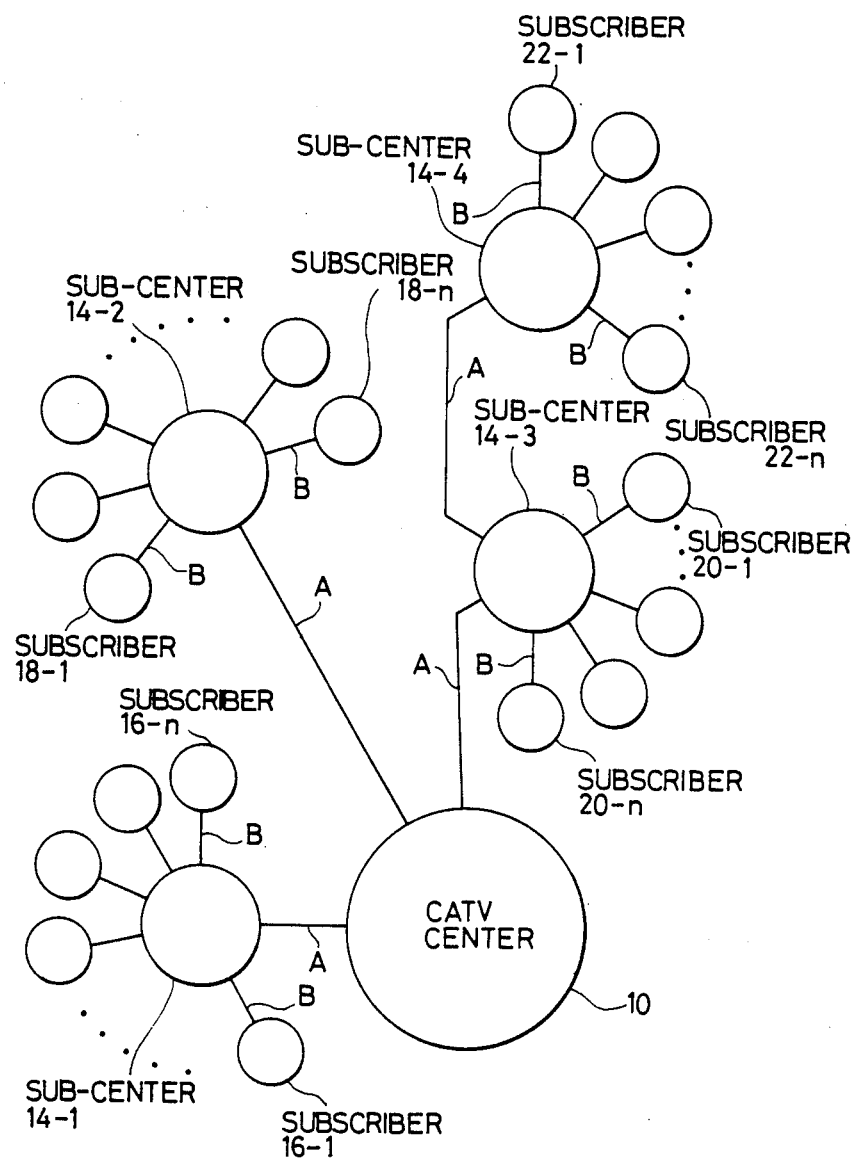
FIG. 2 is a block diagram of a known sub-center type switched-star transmission system.

As shown in FIG. 3, in a CATV center 27, a plurality of picture signal inputs In 1 and In 2 are converted into pulse frequency modulation signals (hereinafter referred to as "PFM signals", when applicable) in well known pulse frequency modulators (hereinafter referred to as "PFM modulators", when applicable) 28-1 and 28-2. The PFM signals are applied to optical transmitters 30-1 and 30-2, where they are converted into optical form. The optical signals are transmitted through optical fibers 32-1 and 32-2 to a sub-center 24. Of course, the optical signals are actually transmitted to a plurality of sub-centers 24 over a plurality of sets of optical fibers 32-1 and 32-2 as illustrated in FIG. 2, but only a single sub-center 24 is illustrated in FIG. 3 for simplicity and clarity.

Also to simplify the description, only two picture signal inputs In 1 and In 2 are shown. However, in practice, thirty to fifty picture signal inputs are employed, and accordingly the numbers of PFM modulators, optical transmitters and optical fibers are increased in correspondence to the number of picture signal inputs.

In sub-center 24, the optical signals transmitted through optical fibers 32-1 and 32-2 are converted into electrical form in optical receivers 34-1 and 34-2. That is, the aforementioned PFM signals are reproduced in electrical form.

The PFM signals are subjected to frequency division in well known digital frequency dividers 36-1 and 36-2 each made up of flip-flop circuits, for example. That is, each of frequency dividers 36-1 and 36-2 may be a digital IC which is commercially available at a relatively low price. As a result, the carrier wave frequency of each PFM signal is decreased as much as the frequency division ratio, and the frequency deviation of the PFM signal is reduced as much as the frequency division ratio.

Because of digital frequency division, the waveforms of the PFM singals thus frequency-divided are square, including a number of harmonic components. The PFM signals are applied to band-pass filters 38-1 and 38-2 which transmit the fundamental components of the signals only so that harmonic components are removed. As a result, the waveforms become sinusoidal (these signals being referred to as "FM signals" hereinafter, when applicable). Each of band-pass filters 38-1 and 38-2 may be, for example, a well-known surface acaustic wave filter which is small in size and low in cost to manufacture.

The two (in practice, 30 to 50) FM signals which have been obtaining by processing the different picture signals (In 1 and In 2 in CATV center 27) as described above are converted into those in different frequency bands by well-known frequency converters 40-1 and 40-2, respectively. The FM signals in the different frequency bands are applied to a well-known mixer 42. The output of mixer 42 is applied to an optical transmitter 44, where it is converted into optical form which is applied to an optical fiber 46. In this case, since the frequency bands are different, even if the FM waves are mixed so as to be applied to one optical fiber, the FM waves will not interfere with each other. Of course, in practice the optical frequency multiplexed signal is applied to a number of fibers 46 each going to a different subscriber as illustrated in FIG. 2. However, only a single subscriber 26 is illustrated in FIG. 3 for clarity.

At subscriber 26, the optical signal transmitted through the single optical fiber 46 is converted into an electrical form by an optical receiver 48. That is, the conversion provides a signal in which a plurality of FM signals having different frequency bands are mixed.

The signal is applied to well-known FM demodulators 50-1 and 50-2 provided only for the FM frequency bands on which picture signals have been plased. As a result, picture signal outputs, Out 1 and Out 2 corresponding, respectively, to the original picture signals, i.e., the picture signal inputs In 1 and In 2 in CATV center 27, can be obtained. For simplification in description, only two FM demodulators 50-1 and 50-2 are shown; however, in practice, the number of FM modulators is equal to the number (two to five) of picture signals transmitted to that particular subscriber.

As is apparent from the above description, according to the invention, a plurality of picture signals can be transmitted even with only one optical fiber between the sub-center and each subscriber.

In sub-center 24, of all the picture signals transmitted from CATV center 27, only selected ones should be transmitted to the subscribers. Therefore, in general, a video switch for selecting the particular picture signals to be transmitted to the subscribers is provided in sub-center 24. In the CATV system according to the invention, video switch 52 or 54 in FIG. 3 may be installed. The signals passing through video switch 52 or 54 are the PFM signal, i.e., square-wave digital signals.

Although only a single embodiment of this invention has been described in detail above, those skill in the art will readily appreciate that many modifications are possible within the spirit and teaching of this invention. For example, the above-described embodiment transmits picture signals from the CATV center to the subscriber. However, those skill in the art will readily appreciate that any sgnals (such as data signals, for example) can be transmitted. Also, each sub-center converts the PFM signals from optical form to electrical form for processing and then reconverts the signals from electrical form to optical form. Those skill in the art will readily appreciate that as technology develops.

Accordingly, all such modifications are intended to be included within the scope of this invention as defined by the following claims.

What is claimed is:

1. A optical transmission system comprising:
    a central source of a plurality of transmission signals, said source including first means for converting each of said transmission signals into a pulse frequency modulation (PFM) signal;
    a plurality of first means for optically transmitting a plurality of said PFM signals;
    a plurality of sub-centers each connected to one of said plurality of first transmitting means, respectively, each said sub-center including second means for converting each of said PFM signals into a frequency modulated (FM) signal, respectively, and means for frequency multiplexing said FM signals to produce a multiplexed signal;
    a plurality of second means for optically transmitting said multiplexed signal from each said sub-center; and
    a plurality of subscriber means, each connected to one of said second transmitting means, respectively, each for converting said multiplexed signal back into said plurality of transmission signals.

2. A system as in claim 1 wherein said first converting means includes one pulse frequency modulation modulator for each of said transmission signals, respctively, and one optical transmitter connected to each of said pulse frequency modulation modulators, respectively.

3. A system as in claim 2 wherein said first transmitting means includes a plurality of optical fibers, one of said optical fibers transmitting each of said PFM signals, respectively.

4. A system as in claim 3 wherein each of said plurality of second transmitting means includes a single optical fiber for connecting each of said sub-center to one of said subscriber means, respectively.

5. A system as in claim 4 wherein each of said subscriber means includes an optical receiver coupled to said single optical fiber and a frequency modulation demodulator connected to said optical receiver.

6. A system as in claim 1 wherein each of said second converting means includes means for frequency dividing each of said PFM signals, respectively, and means, connected to said frequency dividing means, for bandpass filtering signals from said frequency dividing means.

7. A system as in claim 6 wherein said frequency multiplexing means includes means for frequency converting each said FM signal and means for mixing said FM signals from said frequency converting means.

8. A system as in claim 1 wherein said second converting means includes switch means for selecting ones of said PFM signals to be converted into FM signals.

9. An optical transmission system comprising:
    A central source of a plurality of transmission signals, said source including means for converting each of said transmission signals into a pulse frequency modulation (PFM) signal;
    a plurality of sets of optical fibers, each of said sets including a plurality of optical fibers each for transmitting one of said PFM signals;
    a plurality of subcenters each connected to one of said plurality of sets of optical fibers, respectively, each said sub-center including a plurality of frequency dividing means, each of said frequency dividing means for frequency dividing one of said PFM signals, means for band-pass filtering signals from said frequency dividing means to produce frequency modulated (FM) signals and means for frequency multiplexing said FM signals to produce a multiplexed signal;
    a plurality of other optical fibers for optically transmitting said multiplexed signal each said sub-center; and
    a plurality of subscriber means, each connected to one of said other optical fibers, respectively, for converting said multiplexed signals back into said plurality of transmission signals.

10. A system as in claim 9 wherein said converting means includes a plurality of pulse frequency modulation modulators, each for receiving one of said plurality of transmission signals and a plurality of optical transmitters, one connected to each of said pulse frequency modulation modulators, respectively.

11. A system as in claim 10 wherein said frequency multiplexing means includes means for frequency converting each of said FM signals and means for mixing said converted FM signals to produce said multiplexed signal.

12. A system as in claim 11 wherein each of said subscriber means includes an optical receiver for receiving said multiplexed signal and means for demodulating said multiplexed signal.

13. A system as in claim 9 wherein said frequency dividing means includes switch means for selecting ones of said PFM signals to be applied to said band-pass filtering means.

14. A method of optically transmitting signals comprising the steps of:
    (a) converting each of plurality of transmission signals from a central source into a pulse frequency modulation (PFM) signal;
    (b) optical transmitting a plurality of said PFM signals to each of a plurality of sub-centers;
    (c) converting each of aid PFM signals at each of said sub-centers into a frequency modulated (FM) signal, respectively;
    (d) frequency multiplexing said FM signals to produce a multiplexed signal at each of said sub-centers;
    (e) optically transmitting said multiplexed signal from each said sub-center to a plurality of subscriber; and
    (f) converting said multiplexed signal at each of said subscribers back into said plurality of transmission signals.

15. A method as in claim 14 wherein said step (b) includes the step of optically transmitting one of said PFM signals over each of a plurality of optical fibers, respectively.

16. A method as in claim 15 wherein said step (e) includes the step of optically transmitting said multiplexed signal from each said sub-center to each of said subscribers over a single optical fiber, respectively.

17. A method as in claim 14 wherein said step (c) includes the steps of frequency dividing said PFM signals and then band-pass filtering said frequency divided PFM signals to create said FM signals.

18. A method as in claim 17 wherein said step (d) includes the steps of frequency converting said FM signals and then mixing said frequency converted FM signals to produce said multiplexed signal.

19. A method as in claim 14 wherein said step (c) includes the step of selecting ones of said PFM signals to be processed in accordance with said step (d).

20. A method of optically transmitting a plurality of signals comprising the step of:
   (a) converting each of a plurality of transmission signals from a central source into a pulse frequency modulation (PFM) signal;
   (b) optically transmitting a plurality of said PFM signals to each of a plurality of sub-centers over a plurality of sets of optical fibers, one of said PFM signals being transmitted to each said sub-center over one of said optical fibers in each set, respectively;
   (c) frequency dividing each of said PFM signals at each said sub-center;
   (d) band-pass filtering each of said frequency divided PFM signals to form a frequency modulated (FM) signal, respectively;
   (e) frequency multiplexing said FM signals to produce a multiplexed signal;
   (f) optically transmitting said multiplexed signal from each sub-center to a plurality of subscribers, said multiplexed signal from each said sub-center to each said subscriber being transmitted over a single optical fiber, respectively; and
   (g) converting said multiplexed signal at each said subscriber back into said plurality of transmission signals.

21. A method as in claim 20 wherein said step (e) includes the steps of frequency converting each of said FM signals and mixing said frequency converted FM signals to produce said multiplexed signal.

* * * * *